(12) United States Patent
Go

(10) Patent No.: US 11,414,115 B2
(45) Date of Patent: Aug. 16, 2022

(54) MULTI-STAGE LOAD ADJUSTMENT TYPE MOVING CART

(71) Applicant: OKO Co., Ltd., Gwangju (KR)

(72) Inventor: Byeong Ki Go, Gwangju (KR)

(73) Assignee: OKO Co., Ltd., Gwangju (KR)

( * ) Notice: Subject to any disclaimer, the term of this patent is extended or adjusted under 35 U.S.C. 154(b) by 0 days.

(21) Appl. No.: 17/118,149

(22) Filed: Dec. 10, 2020

(65) Prior Publication Data

US 2022/0119023 A1    Apr. 21, 2022

(30) Foreign Application Priority Data

Oct. 16, 2020    (KR) .................. 10-2020-0134339

(51) Int. Cl.
*B62B 3/02* (2006.01)
*G01G 19/12* (2006.01)
*G01P 13/00* (2006.01)
*B62B 5/00* (2006.01)

(52) U.S. Cl.
CPC .............. *B62B 3/02* (2013.01); *B62B 5/00* (2013.01); *G01G 19/12* (2013.01); *G01P 13/00* (2013.01)

(58) Field of Classification Search
CPC .......... B62B 3/02; B62B 3/04; B62B 3/0618; B62B 3/0643; B62B 2203/20; B62B 2203/24; B62B 2203/26
See application file for complete search history.

(56) References Cited

U.S. PATENT DOCUMENTS

| 3,672,634 | A | * | 6/1972 | Chaffin | B62B 3/0618 414/458 |
| 5,885,047 | A | * | 3/1999 | Davis | B62B 1/12 414/490 |
| 2005/0254923 | A1 | * | 11/2005 | Gorski | B62B 3/104 414/426 |
| 2015/0048288 | A1 | * | 2/2015 | Magoto | B62B 3/0618 254/2 C |
| 2019/0308861 | A1 | * | 10/2019 | Reagle | B66C 23/48 |

FOREIGN PATENT DOCUMENTS

| CN | 105857354 A | * | 8/2016 |
| EP | 0569988 A2 | * | 11/1993 |
| KR | 10-0306632 B1 | | 2/2002 |
| KR | 10-0930085 B1 | | 12/2009 |
| KR | 10-2010-0066048 A | | 6/2010 |
| KR | 10-1001677 B1 | | 12/2010 |

(Continued)

*Primary Examiner* — Katy M Ebner
(74) *Attorney, Agent, or Firm* — Studebaker & Brackett PC

(57) ABSTRACT

The present disclosure discloses a multi-stage load adjustment type moving cart. The multi-stage load adjustment type moving cart according to the present disclosure includes: a base frame; a vertical frame vertically installed on one side of the base frame; an inclination angle adjustment unit installed on one side of the vertical frame and configured to selectively elongate a rod; a variable inclination rail having an upper one end supported to be rotatable around a hinge point hinge-coupled to the vertical frame and having one lower end connected to the inclination angle adjustment unit; and a raising and lowering unit including a raising and lowering body provided with a first roller and a second roller coming into rolling.

4 Claims, 18 Drawing Sheets

(56) References Cited

FOREIGN PATENT DOCUMENTS

| KR | 20140001888 U | * | 4/2014 |
|----|----|----|----|
| KR | 10-2014-0074679 A | | 6/2014 |
| KR | 20140073178 A | * | 6/2014 |
| KR | 101459309 B1 | * | 11/2014 |
| KR | 10-1761260 B1 | | 7/2017 |
| KR | 10-2018-0067292 A | | 6/2018 |
| KR | 10-1967229 B1 | | 4/2019 |
| KR | 102120343 B1 | * | 6/2020 |

* cited by examiner

-- Prior Art --

MULTI-STAGE LOAD ADJUSTMENT TYPE MOVING CART

CROSS-REFERENCE TO RELATED APPLICATION

This application claims priority to and the benefit of Korean Patent Application No. 10-2020-0134339 filed on Oct. 16, 2020, the disclosure of which is incorporated herein by reference in its entirety.

BACKGROUND

1. Field of the Invention

The present disclosure relates to a multi-stage load adjustment type moving cart, and more particularly, to a multi-stage load adjustment type moving cart which allows the height to be automatically adjusted such that work is performable at a set working position according to the load size of a loaded cargo with only a simple manipulation, and which is allowed to monitor a situation around the moving cart when it is difficult to look ahead due to the cargo loaded on the moving cart or prevent a collision with a pedestrian or a structure when moving, thereby improving work convenience and workability.

2. Discussion of Related Art

In general, a transfer cart is for transferring a loaded object, includes a frame provided with wheels and a loading box such that the loaded object can be loaded and moved, and has inconvenience in that since the height of the loading box is fixed, a user should bend his/her waist or legs according to the loading height of the loaded object to raise or lower the loaded object.

In order to solve these disadvantages, as illustrated in FIG. 1, a raising and lowering worktable according to the related art includes a base frame 110, a mounting frame 130 including a plate on which tools or materials are loaded, and a raising and lowering link structure 150 for raising and lowering the mounting frame 130. The height of the raising and lowering worktable according to the related art is adjusted as the mounting frame 130 is raised or lowered by vertical expansion and contraction of the link structure 150.

However, the above-described raising and lowering worktable according to the related art is formed in an overall complex structure due to the link structure 150 for raising and lowering the mounting frame 130, thereby causing malfunctions and failures, and there are difficulties in stably supporting a load and precisely adjusting the height when the weight of the loaded materials is relatively large.

In order to solve these problems, various raising and lowering worktables have been developed. However, in the raising and lowering worktable according to the related art, in most cases, a worker adjusts the raising and lowering height through a pump, an electric motor, or other actuators as needed. Further, when it is necessary to frequently change the height of the worktable, the time consumed for adjusting the height of the worktable is lengthened, which reduces work efficiency.

To solve the above problems, the present applicant has proposed a "transfer cart" disclosed in Korean Patent Application Publication No. 10-2010-0066048, a "transfer cart" disclosed in Korean Patent No. 10-0930085, and a "foldable transfer cart" disclosed in Korean Patent Application Publication No. 10-2014-0074679. However, according to the related art, since products having various weights cannot be loaded on one type of cart according to a difference in load, a transfer cart should be provided for each weight of the cargos. Thus, there is inconvenience in use due to an economic burden and limitation of a use range according to the weight.

To solve these problems, the present applicant has proposed a "raising and lowering worktable" disclosed in the Korean Patent Application Publication No. 10-2018-0067292. However, the raising and lowering worktable according to the related art has a disadvantage in that since a work support cannot be structurally in contact with the ground, a pallet for loading cargo cannot be held and transported.

Further, when the transfer cart moves in a state in which the cargo is loaded, it is difficult to look ahead due to the height of the cargo, and thus accidents frequently occur in which the transfer cart collides with people, structures or the like.

RELATED ART

Patent Document (Patent Document 0001) Korean Patent No. 10-0306632: Apparatus for adjusting height of cart (Patent Document 0002) Korean Patent No. 10-1001677: Transport device provided with support for raised or lowered object to be transported (Patent Document 0003) Korean Patent No. 10-1761260 (Jul. 19, 2017)

(Patent Document 0004) Korean Patent No. 10-1967229 (Apr. 3, 2019)

SUMMARY OF THE INVENTION

To solve the above-described problems of the related art, an objective of the present disclosure is to provide a multi-stage load adjustment type moving cart in which while hydraulic pressure is used as an operating pressure, a tensile force of a load spring may be adjusted only using a simple task of a worker stepping on a foot pedal, and the worker may adjust the working height according to the load size of loaded cargo in a predetermined manner, and thus the convenience of use and the workability according to unloading and loading of the cargo can be improved.

Another objective of the present disclosure is to provide a multi-stage load adjustment type moving cart in which as a working position may be moved down close to the ground when the operating pressure is released, a pallet which allows the cargo to be loaded in a standardized size may be transported when the shape of a worktable is changed to a pair of forks, and thus the height may be adjusted to the working position where the worker may easily unload the cargo when the cargo loaded on the pallet is unloaded, and thus work efficiency can be increased.

Still another objective of the present disclosure is to provide a multi-stage load adjustment type moving cart which allows, when the moving cart moves while the cargo is loaded thereon, the worker or his/her neighbor to easily recognize a situation near the moving cart so that collision accidents can be prevented in advance and, when a situation such as a falling object occurs while the loaded cargo moves, the worker to easily identify the situation.

A multi-stage load adjustment type moving cart according to an exemplary embodiment of the present disclosure includes: a base frame provided with a plurality of wheels coming into rolling contact with the ground; a vertical frame vertically installed on one side of the base frame; an inclination angle adjustment unit installed on one side of the vertical frame, configured to receive an operating force to generate an operating pressure, and configured to selectively elongate a rod; a variable inclination rail having an upper one end supported to be rotatable around a hinge point hinge-coupled to the vertical frame and having one lower end connected to the inclination angle adjustment unit, the one lower end having a lever type rotational displacement around the hinge point according to an elongation distance of the rod; and a raising and lowering unit including a raising and lowering body provided with a first roller and a second roller coming into rolling contact with a polygonal fixed rail vertically installed on one inner side of the vertical frame and a load spring having one end fixed to one side of the raising and lowering body, having the other end fixed to an inclination roller coming into rolling contact along the variable inclination rail, configured to apply an elastic force, and placed on the upper side based on the hinge point.

The inclination angle adjustment unit may include a foot pedal installed on one side of the vertical frame and configured to receive foot pressure from a worker, a hydraulic cylinder installed on one inner side of the vertical frame, configured to generate the operating pressure in conjunction with the foot pedal, and configured to elongate the rod hinge-coupled to the variable inclination rail, a release lever configured to release the operating pressure applied to the hydraulic cylinder and protruding from one side of the vertical frame to receive the operating force from the user, and a return spring having one end connected to a body of the hydraulic cylinder and the other end connected to an end of the rod and configured to induce a positional return of the rod when the operating pressure is released.

The raising and lowering unit may be provided with one of a worktable and a pair of forks protruding from one side thereof to hold a pallet in a horizontal direction.

A gas spring having a lower end coupled and fixed to one end of one of the base frame and the vertical frame and an upper end coupled to one end of the raising and lowering unit and configured to apply an elastic support force in a vertical direction may be installed.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
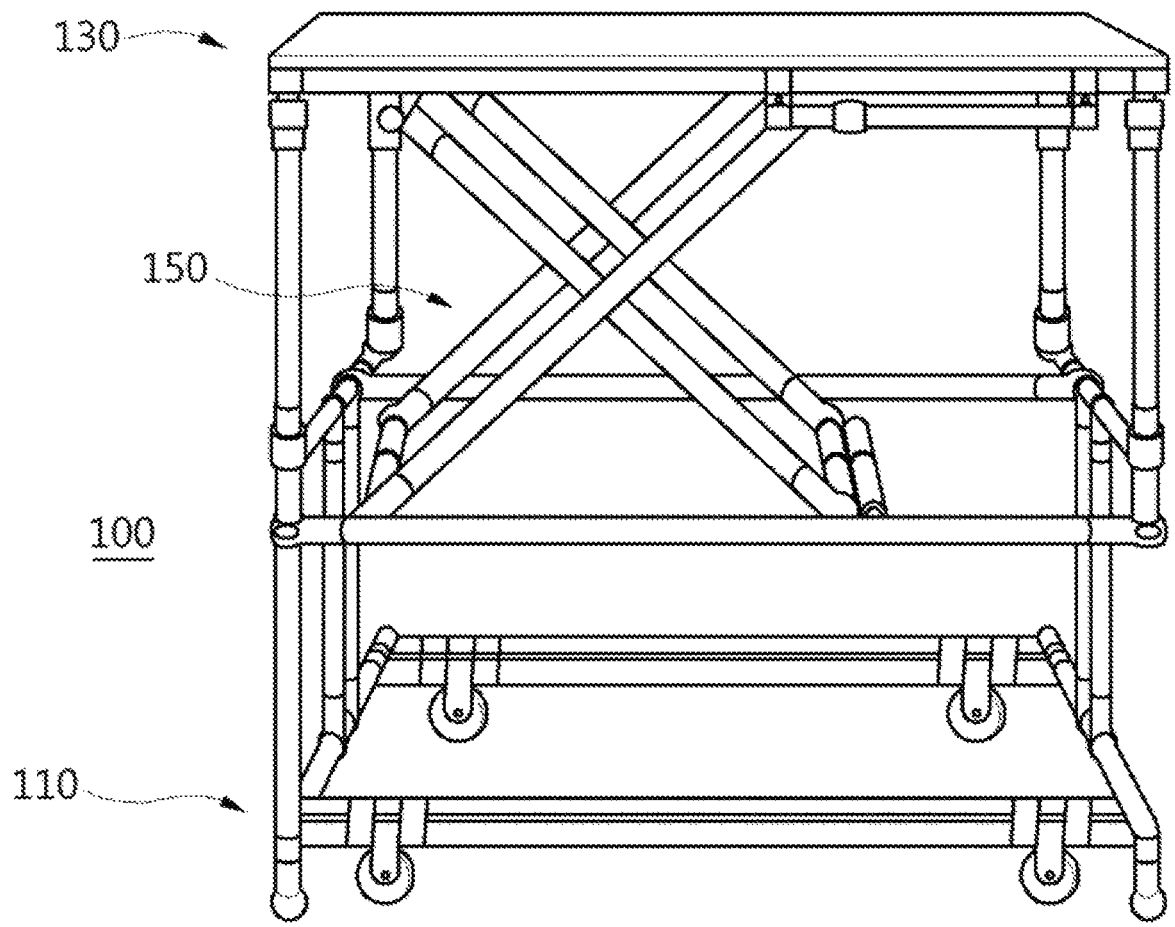
FIG. 1 is a view illustrating a configuration of a height adjustment type cart according to the related art.

Hereinafter, configurations and operations of embodiments of the present disclosure will be described in detail with reference to the accompanying drawings.

However, it should be understood that the present disclosure is not limited to a specific disclosure, and includes all changes, equivalents, and substitutes included in the spirit and scope of the present disclosure. It should be understood that terms such as "include" or "have" used herein are intended to indicate that there is a feature, a step, an operation, a component, a part, or a combination thereof that is described in the specification, and do not exclude in advance the possibility of the presence or addition of one or more other features, steps, operations, components, parts, or combinations thereof. That is, throughout the specification, when a part "includes" a component, this means that another component is not excluded but may be further included unless otherwise stated.

Further, unless otherwise defined, all terms used herein including technical or scientific terms have the same meanings as those commonly understood by those skilled in the art to which the present disclosure belongs. Terms defined in commonly used dictionaries should be interpreted as having the same meanings in the context of the related art and may not be interpreted with ideal or excessively formal meanings, unless explicitly defined in the present application.

Here, repeated description and detailed description related to well-known functions and configurations that may make the subject matter of the present disclosure unclear will be omitted so as not to obscure the subject matter of the present disclosure. The embodiments of the present disclosure are provided to more completely describe the present disclosure to those skilled in the art. Thus, the shapes and sizes of elements in the drawings may be exaggerated for clearer description.

Figure 2:
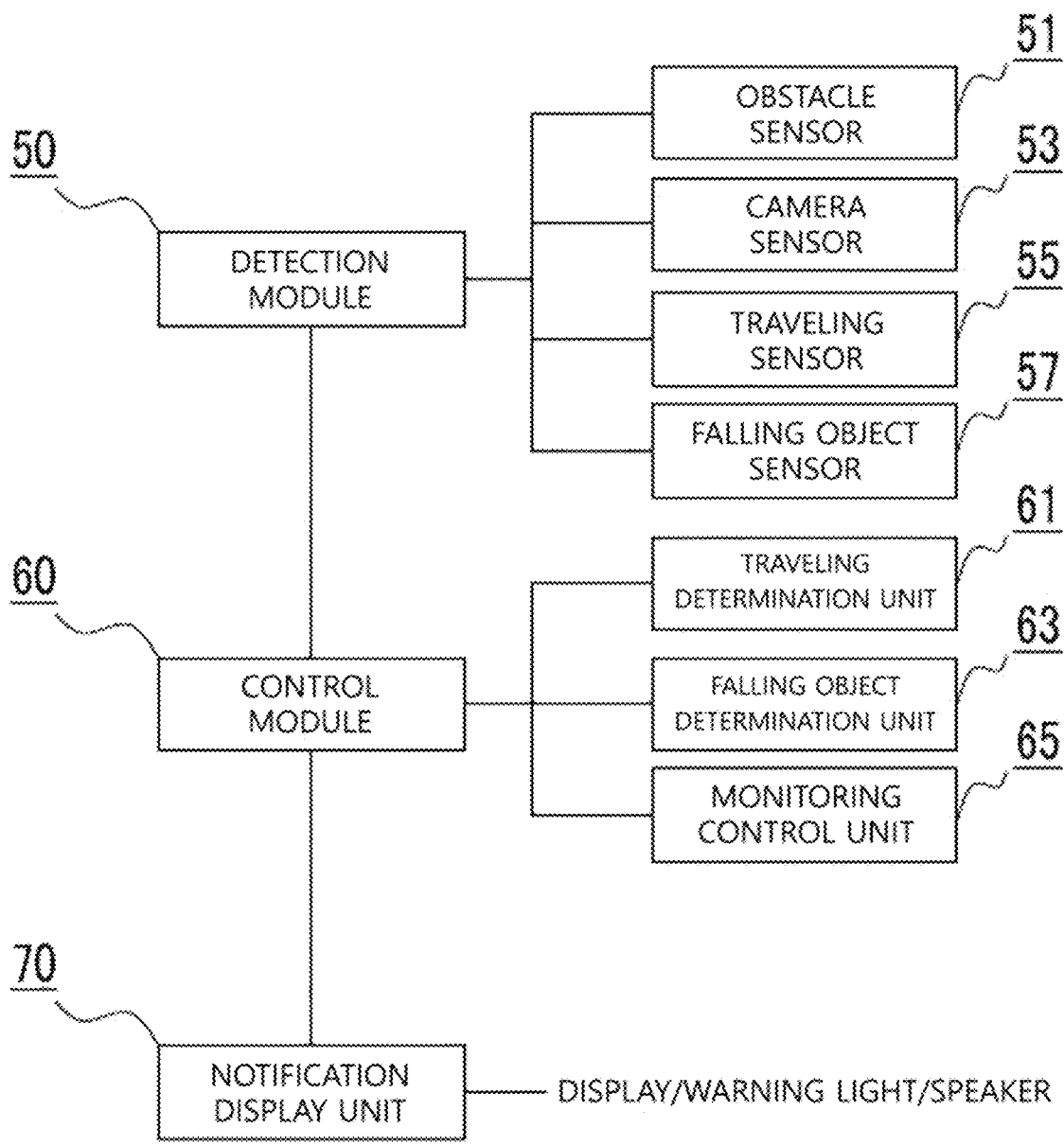
FIG. 2 is a block diagram for describing a control configuration of a multi-stage load adjustment type moving cart according to the present disclosure.

FIG. 2 is a block diagram for describing a control configuration of a multi-stage load adjustment type moving cart according to the present disclosure.

The drawing illustrates a multi-stage load adjustment type moving cart including a detection module 50 including an obstacle sensor 51 installed on the front side with respect to a traveling direction of a base frame 10 and configured to detect the approach of nearby obstacles or people, a camera sensor 53 provided on one side of the obstacle sensor 51 and configured to capture an image, a traveling sensor 55 configured to detect a rolling motion of wheels 11, and a falling object sensor 57 configured to detect the amount of raising and lowering displacement of a raising and lowering unit or configured to detect a change in weight in a state in which a load cell is installed in a loading table or a fork, so as to determine whether there is a falling object during traveling, and a control module 60 including a traveling determination unit 61 configured to determine whether the moving cart is traveling by receiving detection signals from various detection sensors constituting the detection module 50 and performing control processing on the detection signals, a falling object determination unit 63 configured to receive a signal from the falling object sensor 57 and configured to determine whether there is the falling object, and a monitoring control unit 65 configured to receive signals from the falling object determination unit 63 and the camera sensor 53 to apply a control signal to a notification display unit 70 configured to output a screen or a sound.

Figure 3:
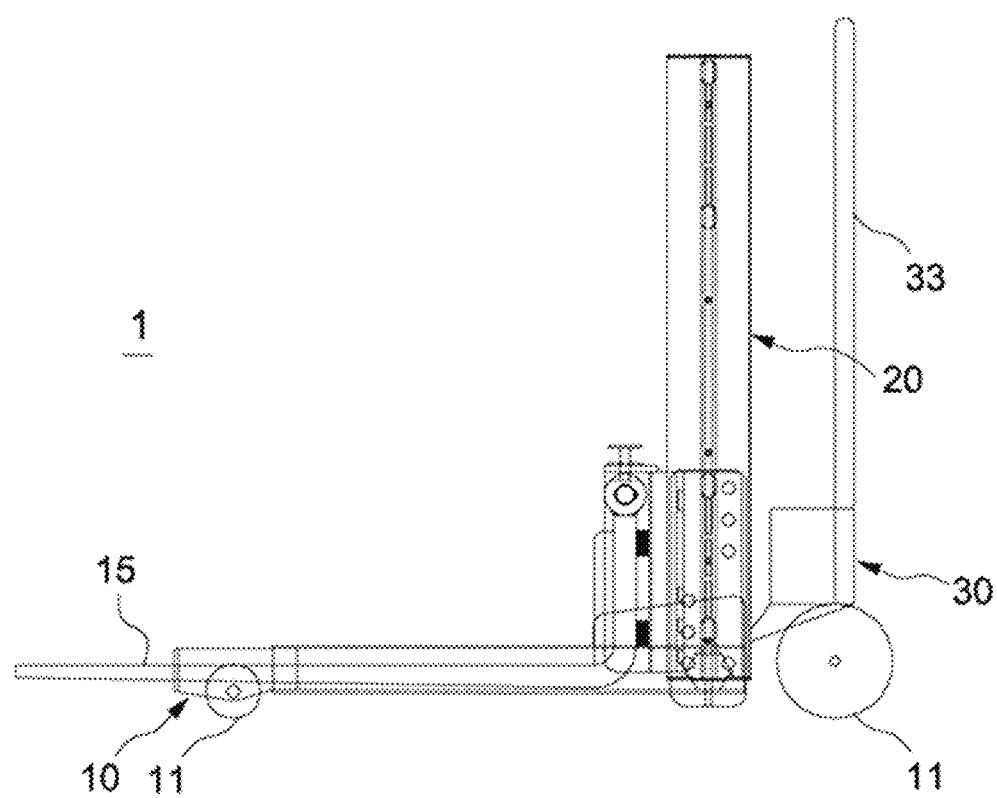
FIG. 3 is a side view illustrating the multi-stage load adjustment type moving cart according to the present disclosure.
Figure 4:
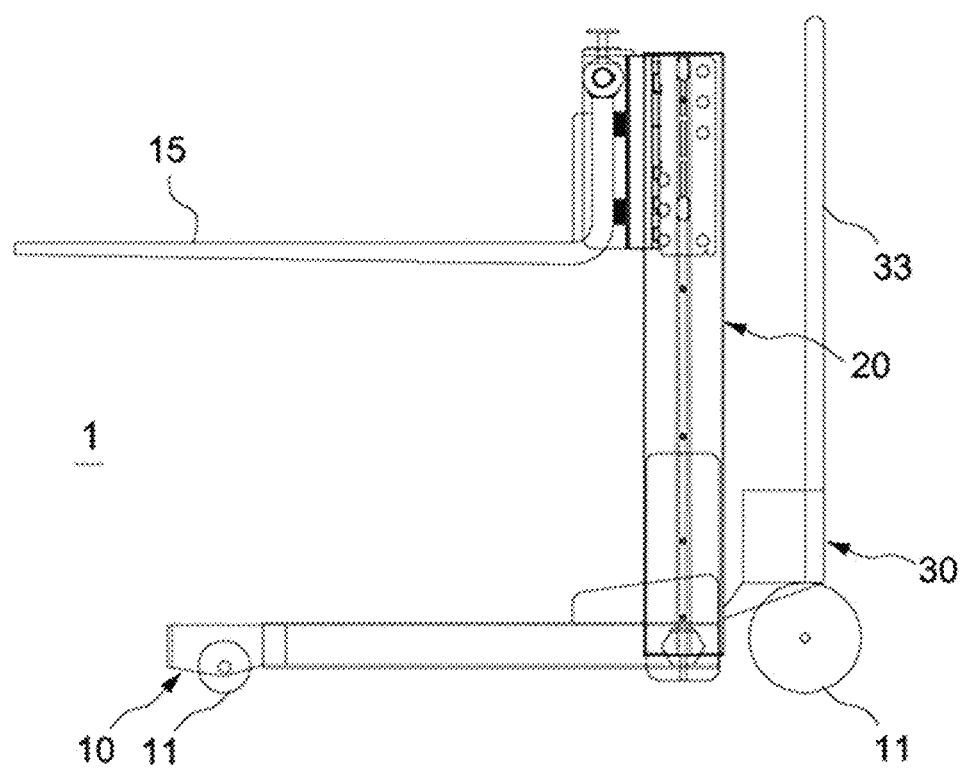
FIG. 4 is a view illustrating a state in which a fork is moved upward in the multi-stage load adjustment type moving cart illustrated in FIG. 3.
Figure 5:
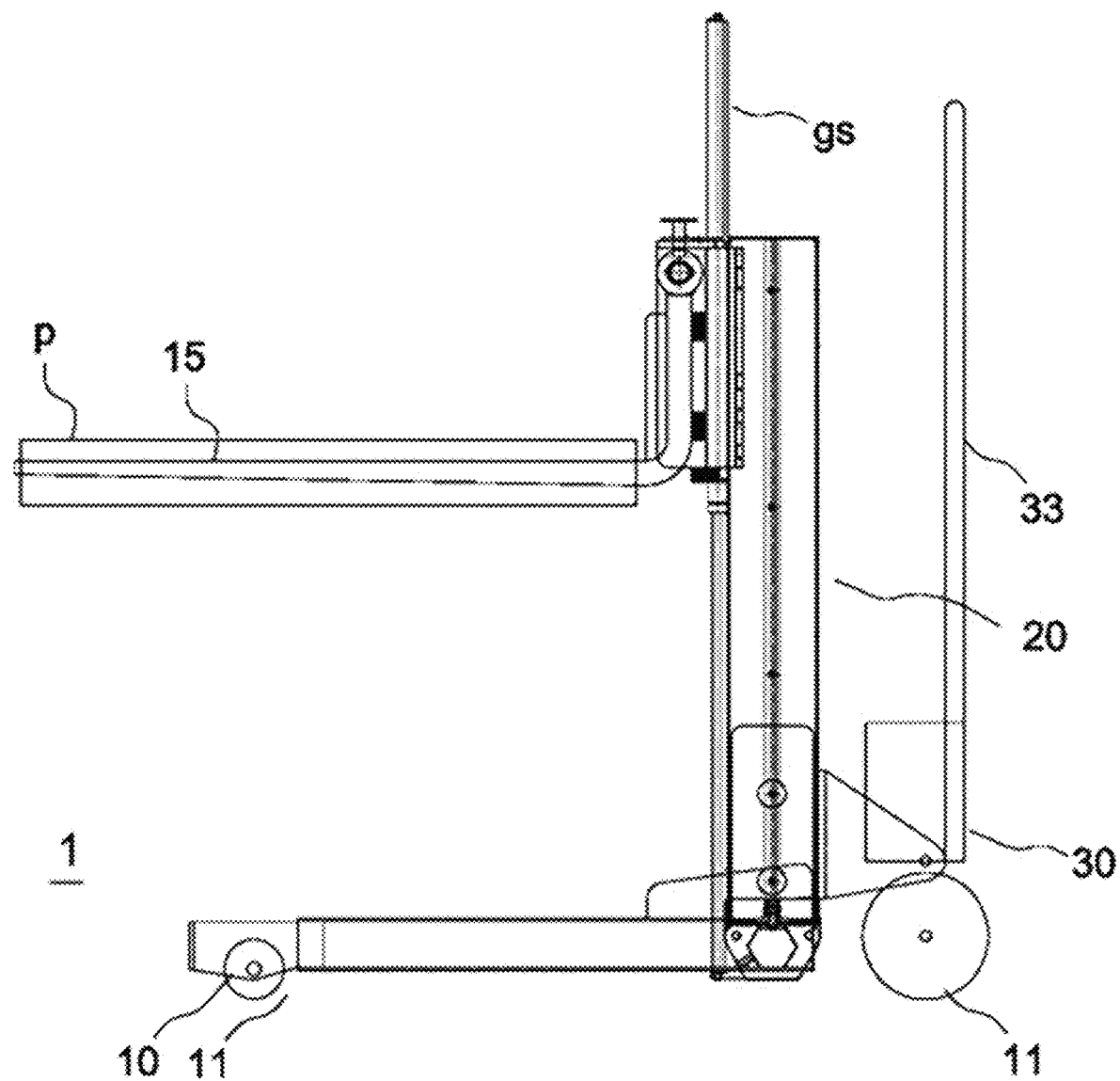
FIG. 5 is a view for describing a state in which a pallet is held in the multi-stage load adjustment type moving cart illustrated in FIG. 4.

FIG. 3 is a side view illustrating the multi-stage load adjustment type moving cart to which a fork 15 type capable of raising a pallet p is applied according to the present disclosure, FIG. 4 is a view illustrating a state in which the fork 15 is moved upward in the multi-stage load adjustment type moving cart illustrated in FIG. 3, and FIG. 5 is a view for describing a state in which the pallet is held in the multi-stage load adjustment type moving cart illustrated in FIG. 4.

The drawing illustrates a multi-stage load adjustment type moving cart 1 including a base frame 10 provided with a plurality of wheels 11 for rolling contact with the ground, a vertical frame 20 vertically installed on one side of the base frame 10, a pair of left and right forks 15 provided to be raised or lowered along the vertical frame 20 and protruding to be inserted into insertion holes (unsigned) provided in the pallet p, and an inclination angle adjustment unit 30 including a foot pedal 31 provided to receive foot pressure from a worker to generate an operating pressure and a release lever 33 provided on one side of the vertical frame 20, provided to be manipulated by a hand of a user, and configured to release the generated operating pressure.

Figure 6:
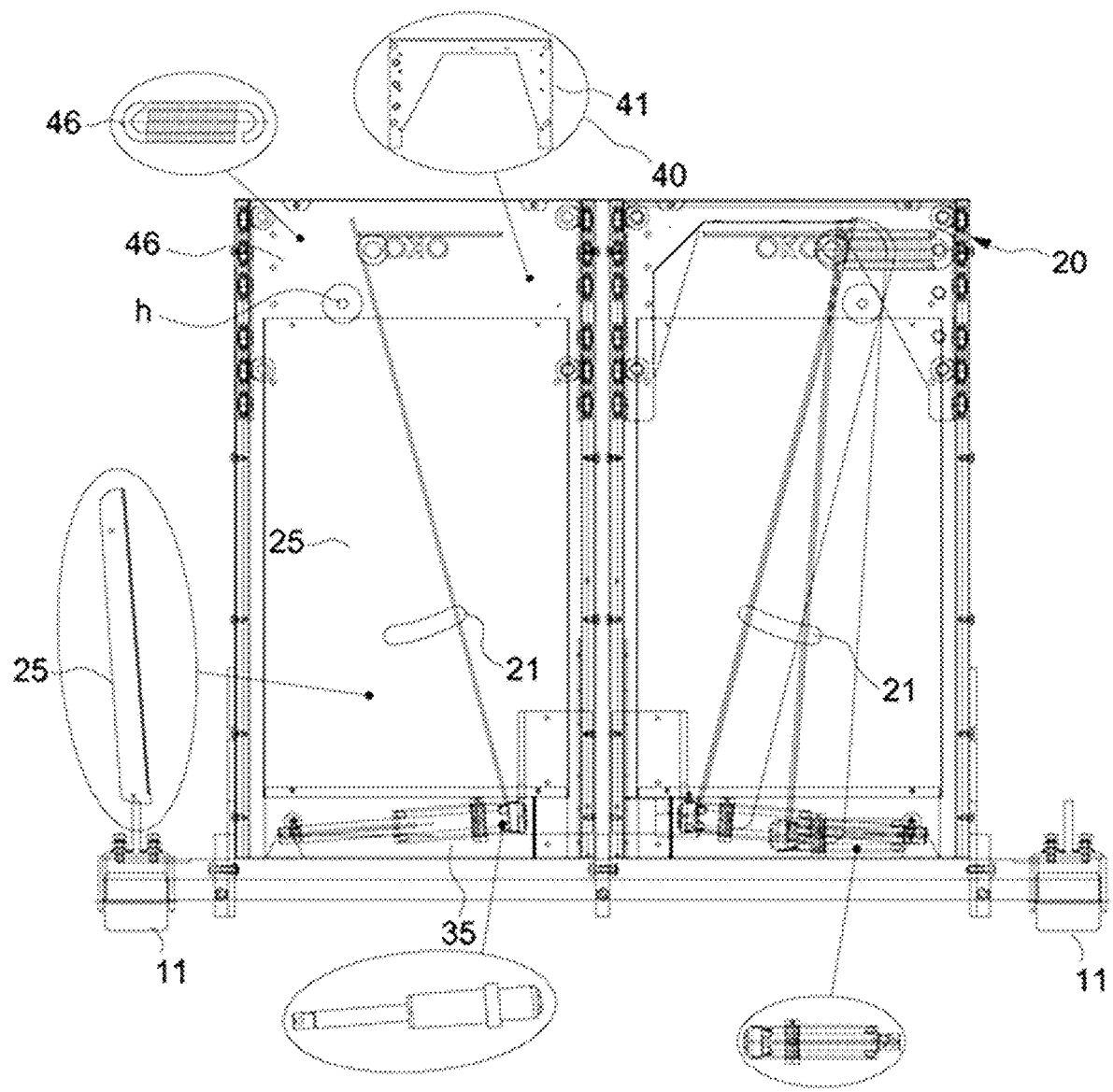
FIG. 6 is a schematic front view illustrating an internal configuration of the multi-stage load adjustment type moving cart according to the present disclosure.

FIG. 6 schematically illustrates an internal configuration of the multi-stage load adjustment type moving cart according to the present disclosure and illustrates an example in which a pair of the left and right inclination angle adjustment units 30 and a pair of left and right variable inclination rails 25 are provided symmetrical to each other to enable use for a loaded object having a high load. The drawing illustrates a configuration in which since the operating pressure is not applied to the inclination angle adjustment units 30, the variable inclination rails 25 are located to be substantially vertical so that a relatively small low load is applied to a raising and lowering unit 40 to which the forks 15 are connected.

Figure 7A:
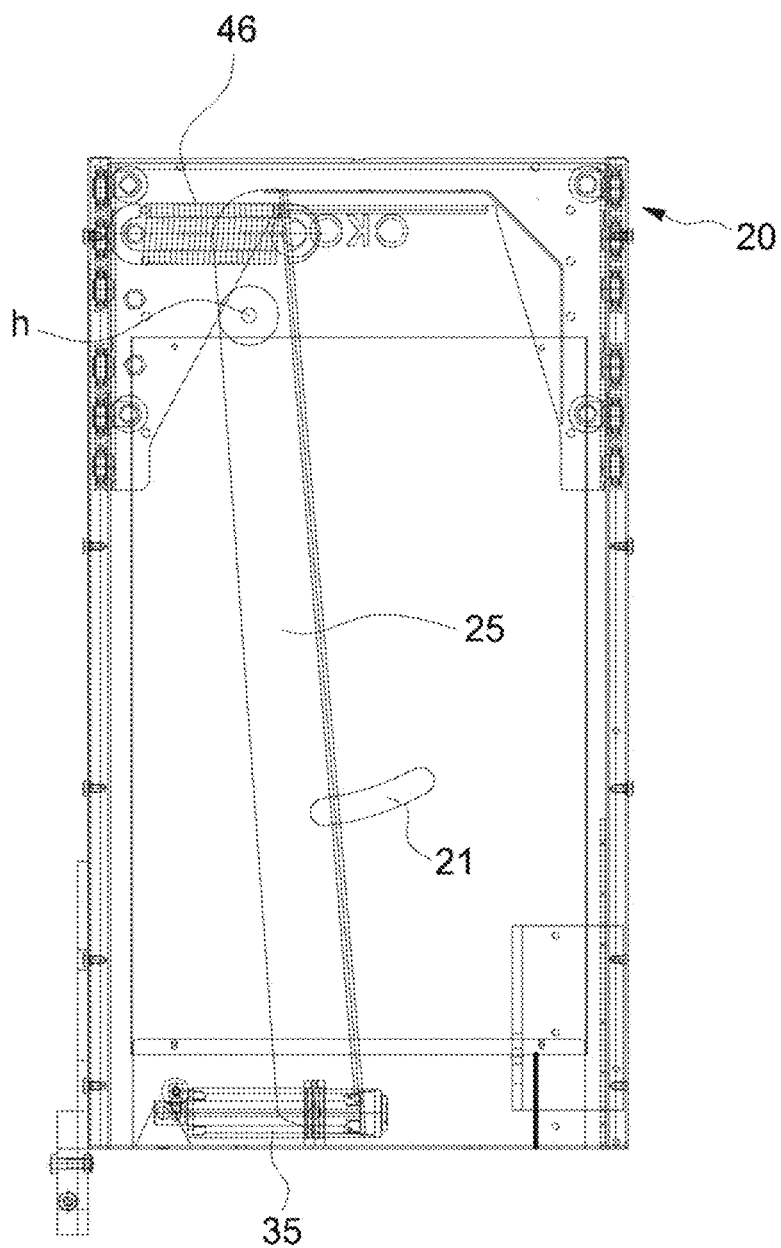
FIGS. 7A and 7B are views for describing an operation of adjusting an inclination angle according to the elongation of a hydraulic cylinder in the multi-stage load adjustment type moving cart illustrated in FIG. 6.
Figure 7B:
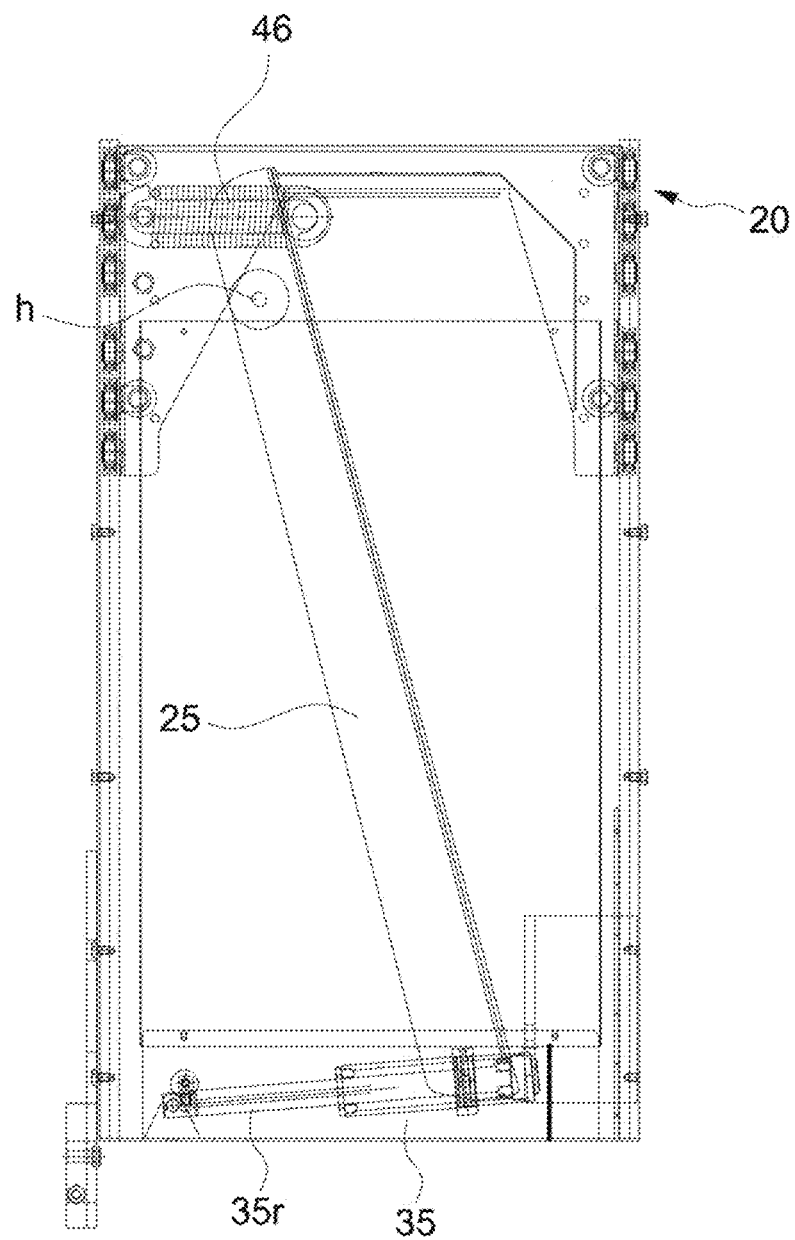

Further, FIG. 7A illustrates, as an example in which a single inclination angle adjustment unit 30, a single variable inclination rail 25, a single load spring 46, and the like are configured for handling a loaded object having a low load as compared to FIG. 6, the multi-stage load adjustment type moving cart 1 is shown in a state in which as a hydraulic cylinder 35 is in a maximum contracted state, an inclination degree of the variable inclination rail 25 is minimized, and thus a relatively high low load is applied to the raising and lowering unit 40 raised or lowered along the variable inclination rail 25, and FIG. 7B illustrates the multi-stage load adjustment type moving cart 1 in a state different from the state of FIG. 7A, that is, in a state in which the hydraulic cylinder 35 constituting the inclination angle adjustment unit 30 is in a maximum elongated state, the inclination angle of the variable inclination rail 25 increases, and thus a relatively high heavy load is applied to the raising and lowering unit 40 raised or lowered along the variable inclination rail 25. An undescribed symbol h indicates a hinge point h configured to rotatably support the variable inclination rail 25. In this case, the hinge point h is disposed below the load spring 46, and the principle of a lever is applied to the hydraulic cylinder 35 and the load spring 46 based on the hinge point h.

Figure 8:
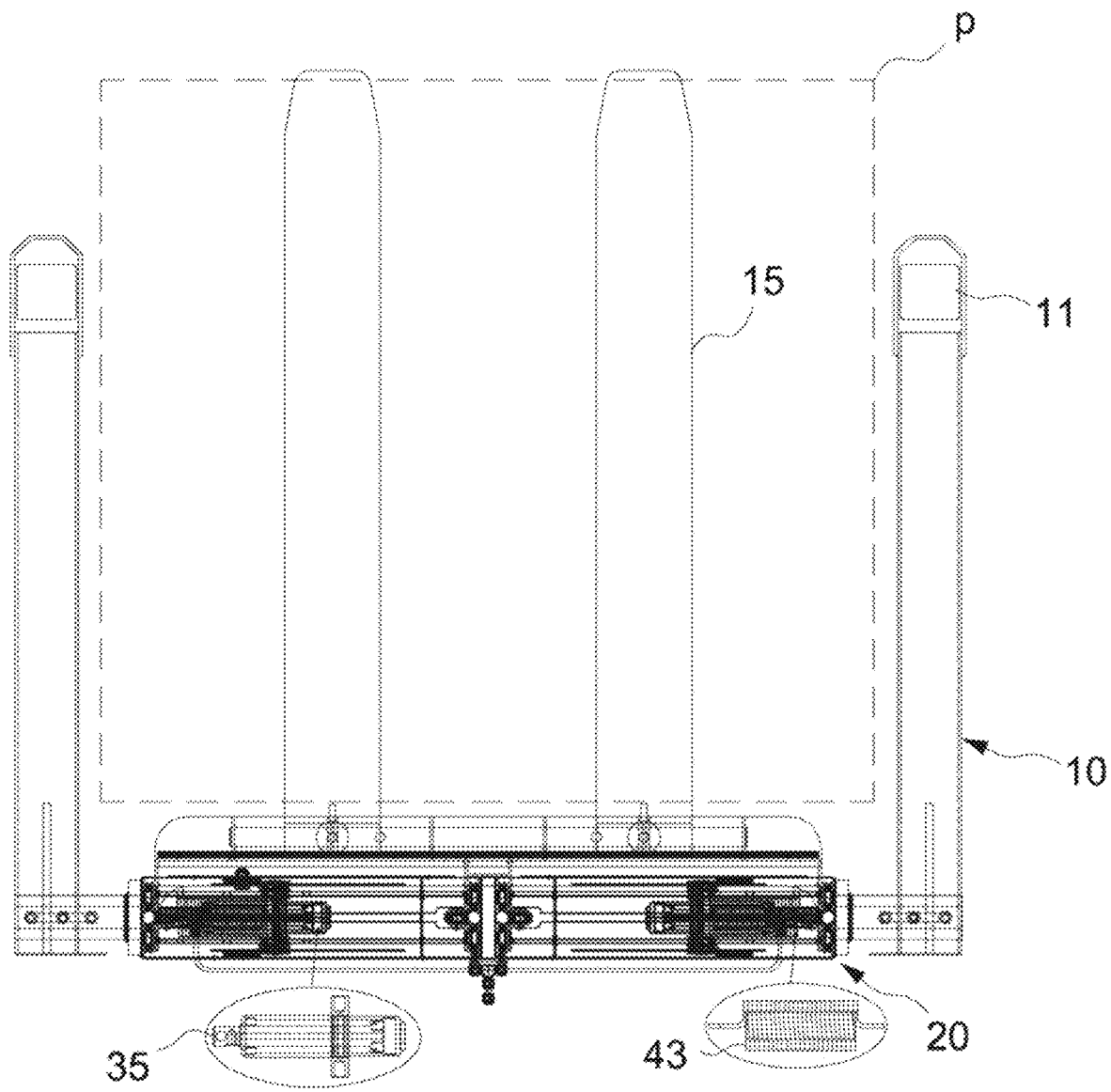
FIG. 8 is a plan view for describing the internal configuration of the multi-stage load adjustment type moving cart according to the present disclosure.
Figure 9:
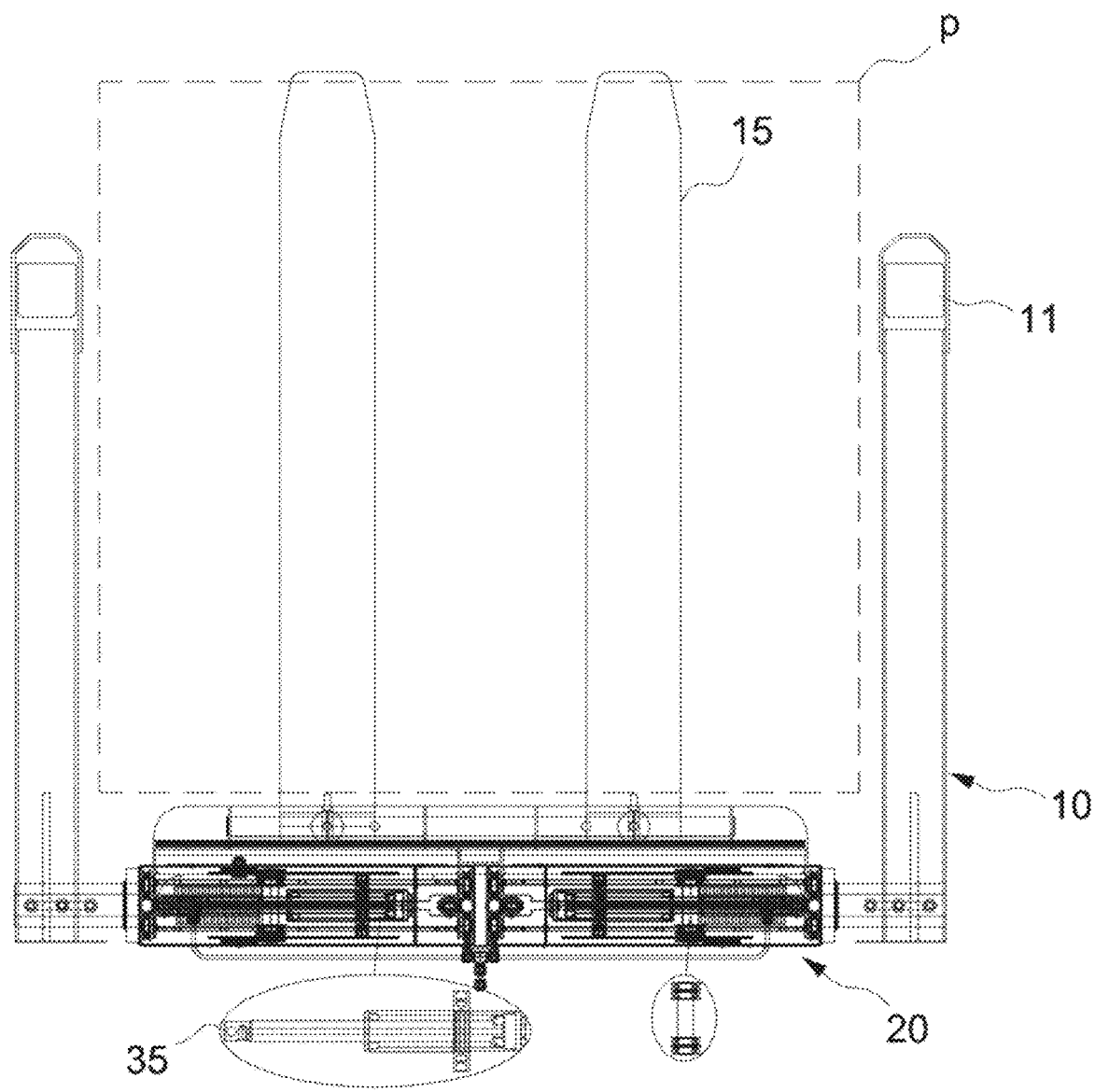
FIG. 9 is a view illustrating a state in which the inclination angle is adjusted according to the elongation of the hydraulic cylinder in the multi-stage load adjustment type moving cart illustrated in FIG. 8.

FIGS. 8 and 9 are plan views for describing an internal configuration of the multi-stage load adjustment type moving cart illustrated in FIG. 6, wherein FIG. 8 illustrates a state corresponding to FIG. 7A in which a rod 35r of the hydraulic cylinder 35 constituting the inclination angle adjustment unit 30 does not appear, and FIG. 9 illustrates a state in which the rod 35r of the hydraulic cylinder 35 is elongated by receiving the operating force from the worker and illustrates the multi-stage load adjustment type moving cart 1 is shown in a state corresponding to FIG. 7B.

Figure 10:
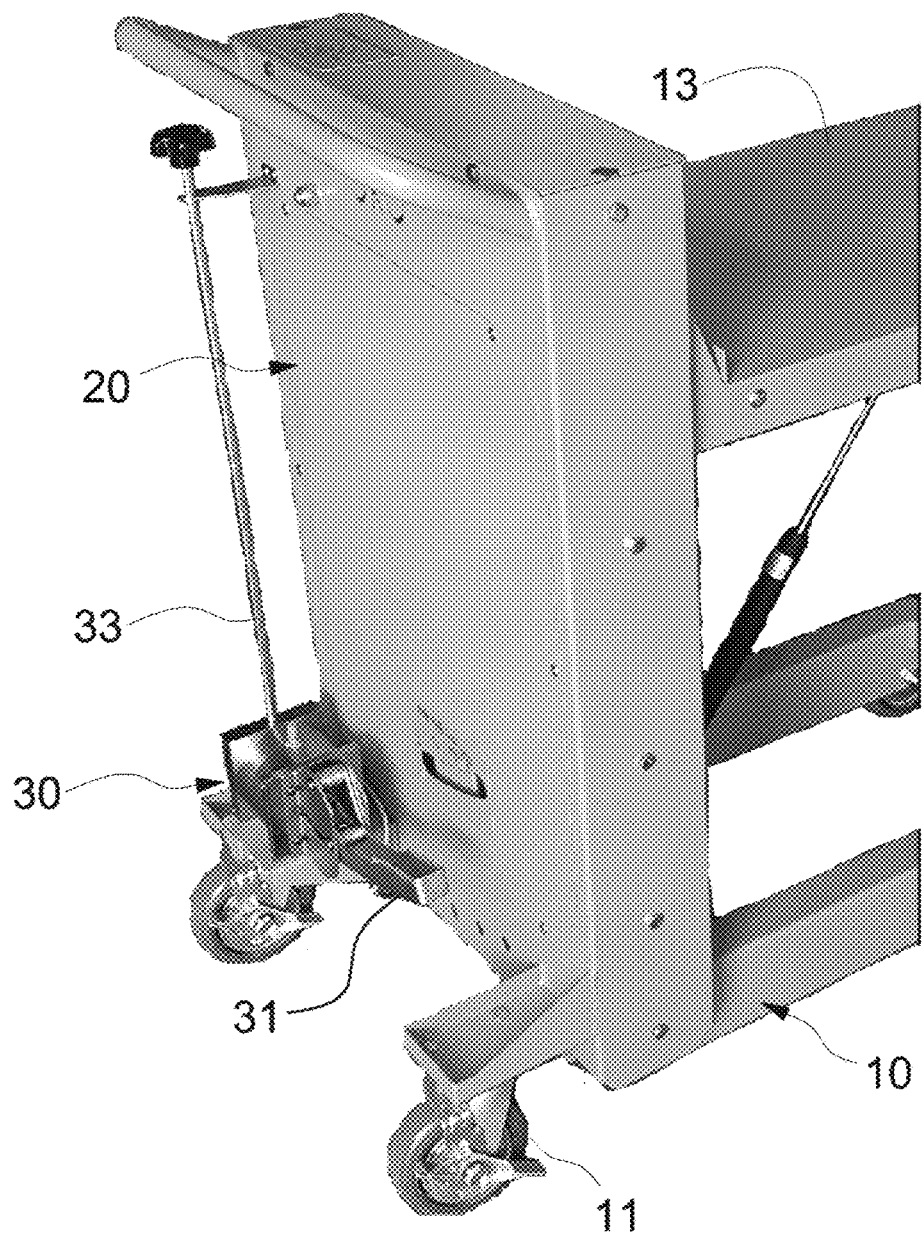
FIG. 10 is a perspective view illustrating the multi-stage load adjustment type moving cart according to the present disclosure.

FIG. 10 is a picture obtained by photographing a part of a prototype to which a loading table-type multi-stage load adjustment type moving cart capable of performing various tasks as well as loading work while the loaded object is placed thereon according to the present disclosure is applied.

The drawing illustrates the multi-stage load adjustment type moving cart 1 including the base frame 10 provided with the plurality of wheels 11, the raising and lowering unit 40 which is vertically provided on one side of the base frame 10 and to which a loading table 13 on which a cargo can be loaded at one side thereof is connected, the loading table 13 raised or lowered while being provided integrally with the raising and lowering unit 40 and configured to provide a working space on which the cargo can be loaded, the vertical frame 20 in which the variable inclination rail 25 configured to guide the raising and lowering unit 40 to be raised or lowered along an inclined surface is accommodated, and the inclination angle adjustment unit 30 having the foot pedal 31 provided behind the vertical frame 20 and configured to receive foot pressure from the worker to generate an operating pressure for the hydraulic cylinder 35 and the release lever 33 configured to release the operating pressure of the hydraulic cylinder 35.

Figure 11:
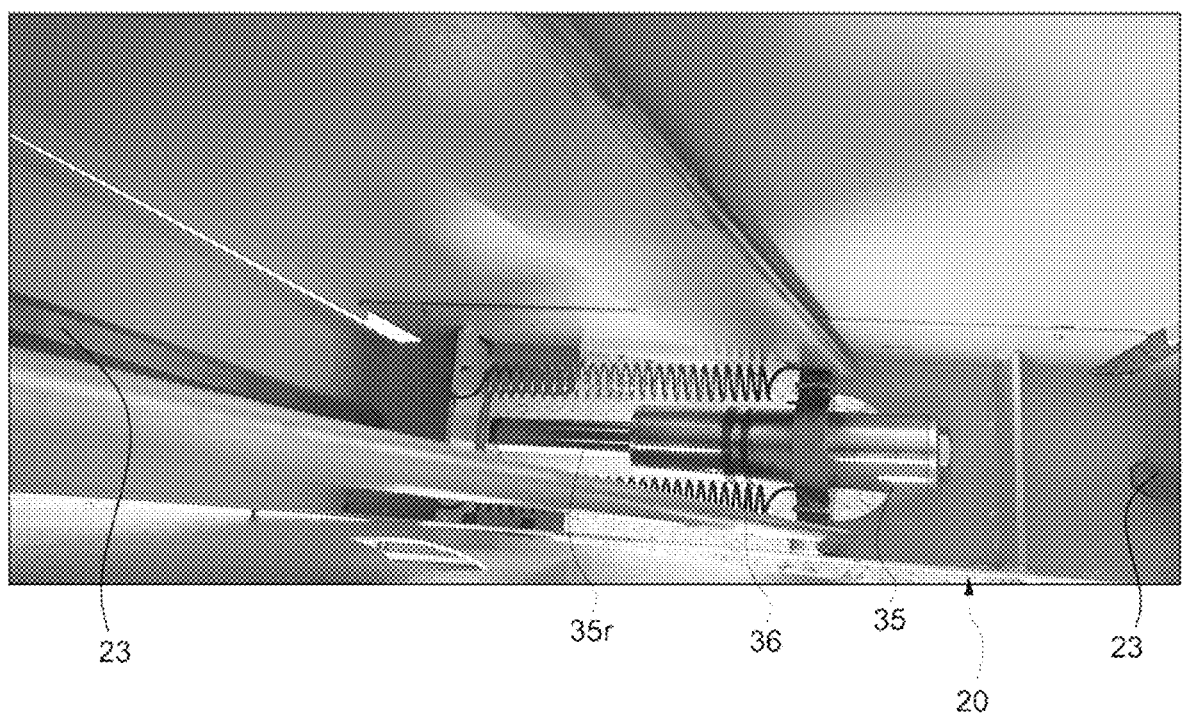
FIG. 11 is a view illustrating an inclination angle adjustment driving unit in the multi-stage load adjustment type moving cart illustrated in FIG. 10.

FIG. 11 is a view illustrating an inclination angle adjustment driving unit in the multi-stage load adjustment type moving cart illustrated in FIG. 10.

The drawing illustrates the inclination angle adjustment unit 30 illustrated in FIG. 10 and including the hydraulic cylinder 35 that elongates the rod 35r in conjunction with the foot pressure applied to the foot pedal 31 and a return spring 36 for rapidly returning the rod 35r to an original position when the operating pressure applied to the hydraulic cylinder 35 is released.

Meanwhile, in the drawing, an end of the rod 35r of the hydraulic cylinder 35 is hinge-coupled to the base frame 10, an end of a body of the hydraulic cylinder 35 is hinge-coupled to a lower end of the variable inclination rail 25, and the lower end of the variable inclination rail 25 is switched to the state of FIG. 6 or 7 according to a degree by which the rod 35r is elongated.

Figure 12:
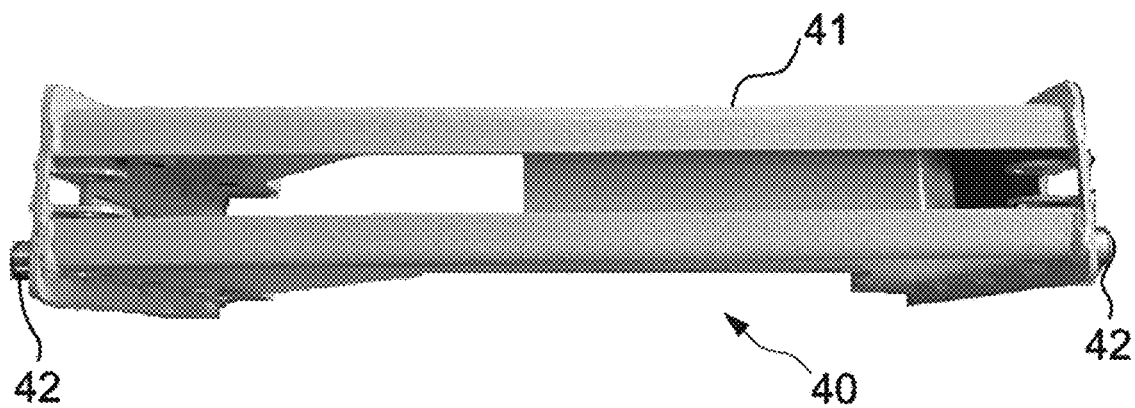
FIG. 12 is a view illustrating only a raising and lowering unit in the multi-stage load adjustment type moving cart illustrated in FIG. 10.

FIG. 12 is a view illustrating only the raising and lowering unit in the multi-stage load adjustment type moving cart illustrated in FIG. 10.

The drawing illustrates the raising and lowering unit 40 including a raising and lowering body 41 including first rollers 42 raised or lowered along the variable inclination rail 25 and configured to come into rolling contact with both surfaces of a polygonal fixed rail 23 vertically provided inside the vertical frame 20 and second rollers 43 provided between the first rollers 42 and configured to come into rolling contact with the polygonal fixed rail 23.

Figure 13:
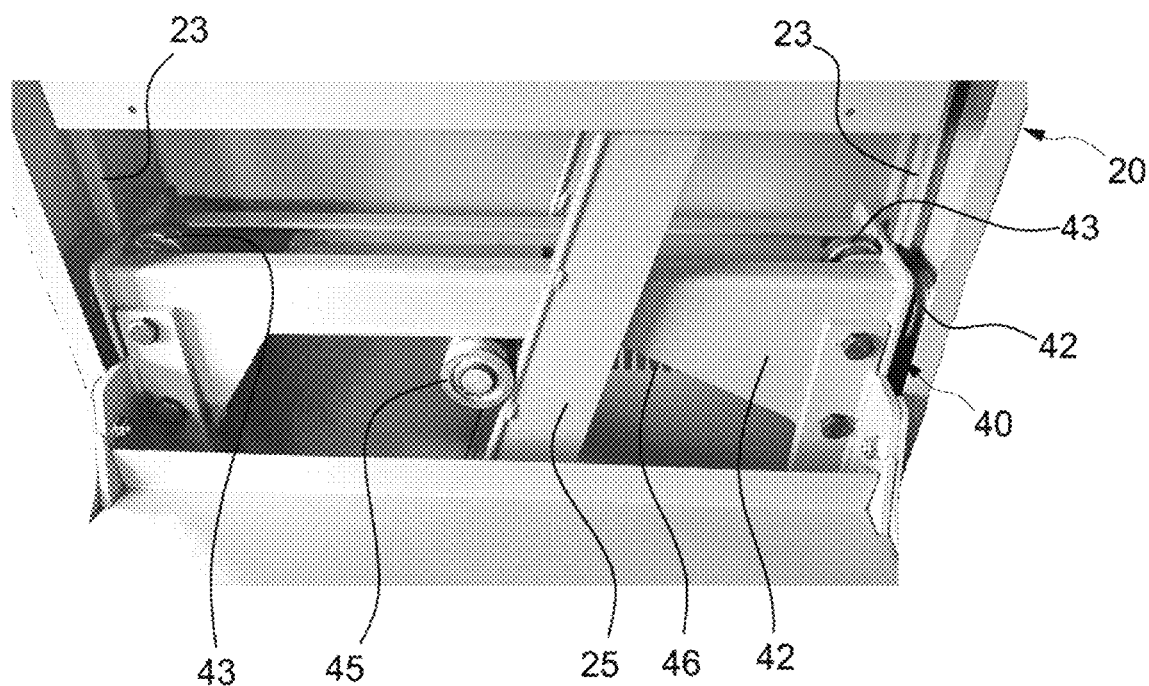
FIG. 13 is a view for describing an operational configuration of the raising and lowering unit in the multi-stage load adjustment type moving cart illustrated in FIG. 10.

FIG. 13 is a view for describing an operational configuration of the raising and lowering unit in the multi-stage load adjustment type moving cart illustrated in FIG. 10.

The drawing illustrates the multi-stage load adjustment type moving cart 1 including the raising and lowering unit 40 including the raising and lowering body 41 provided to be raised or lowered along the variable inclination rail 25 and an inclination roller 45 connected to and supported by the raising and lower body 41 by the load spring 46 and configured to come into rolling contact with the variable inclination rail 25, and the polygonal fixed rails 23 located on both sides of the raising and lowering unit 40, coupled and fixed to the vertical frame 20, and configured to guide the raising and lowering unit 40 to be raised or lowered vertically.

Figure 14:
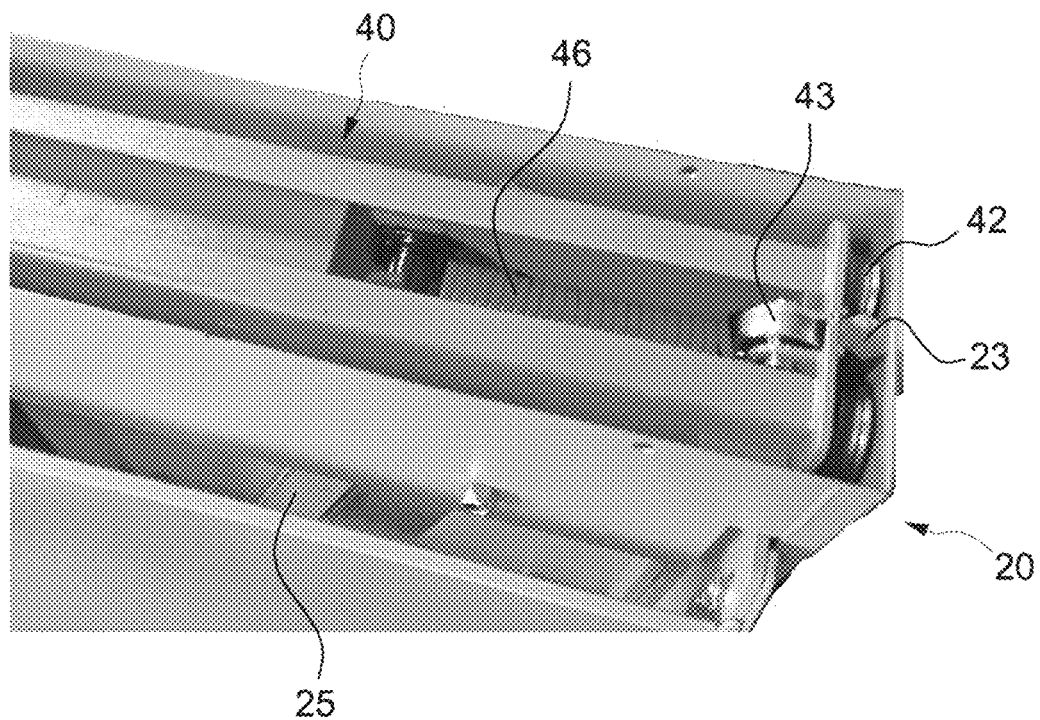
FIG. 14 is a view of the raising and lower unit in the multi-stage load adjustment type moving cart illustrated in FIG. 10 when viewed from above.

FIG. 14 is a view illustrating the raising and lowering unit in the multi-stage load adjustment type moving cart illustrated in FIG. 10 when viewed from above.

The drawing illustrates the multi-stage load adjustment type moving cart 1 including the raising and lowering unit 40 including the raising and lowering body 41 to which the first rollers 42 and the second rollers 43 coming into rolling contact with the polygonal fixed rail 23 fixed to the vertical frame 20 in three directions are rotatably coupled and the load spring 46 coupled and fixed to one side of the raising and lowering body 41 and having the other end connected to the inclination roller 45 coming into rolling contact along the variable inclination rail 25.

Figure 15:
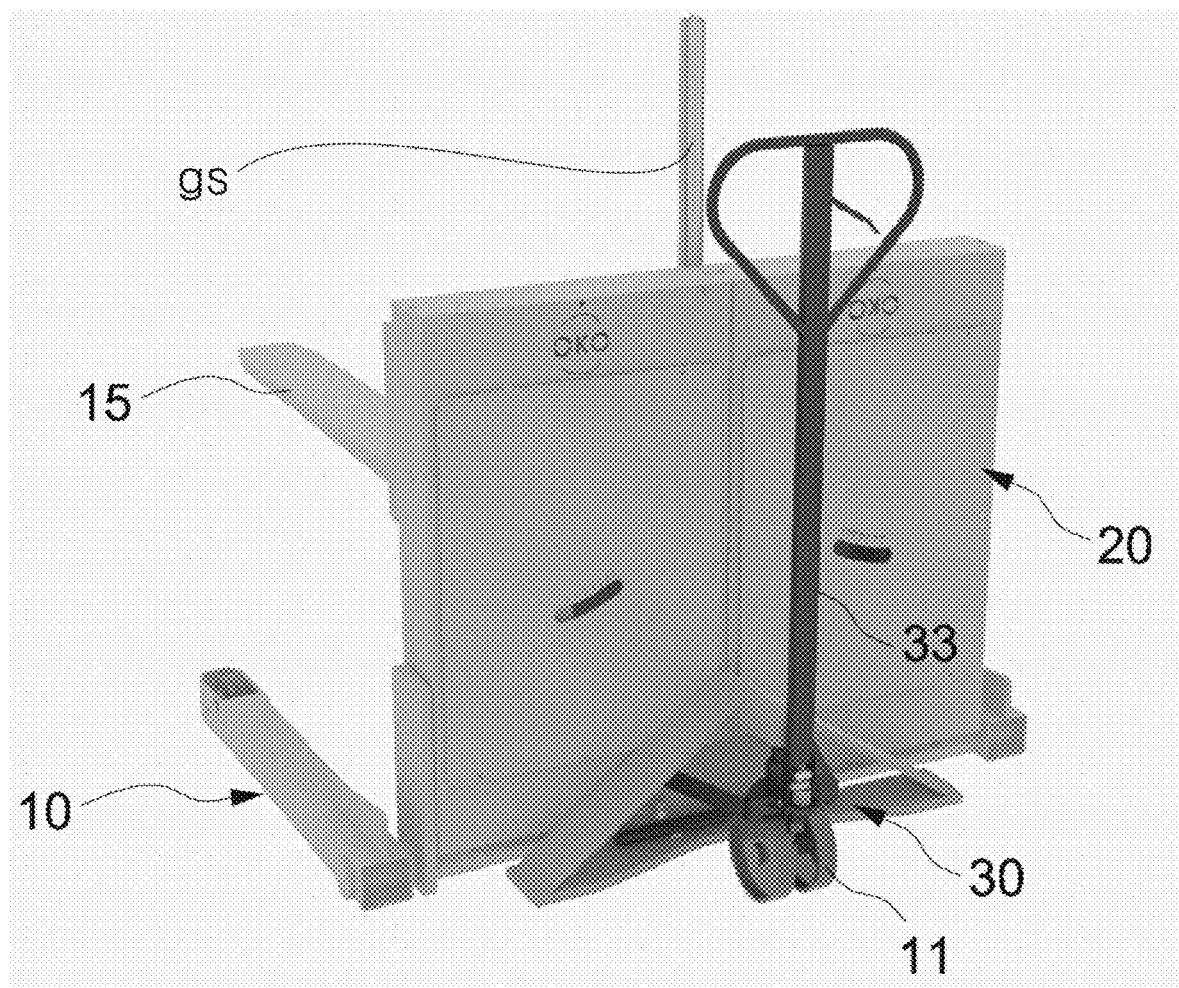
FIGS. 15 to 17 are views illustrating an example of a configuration in which a variable inclination rail and an inclination angle adjustment unit are arranged symmetrical to each other in a left-right direction in the multi-stage load adjustment type moving cart according to the present disclosure.
Figure 16:
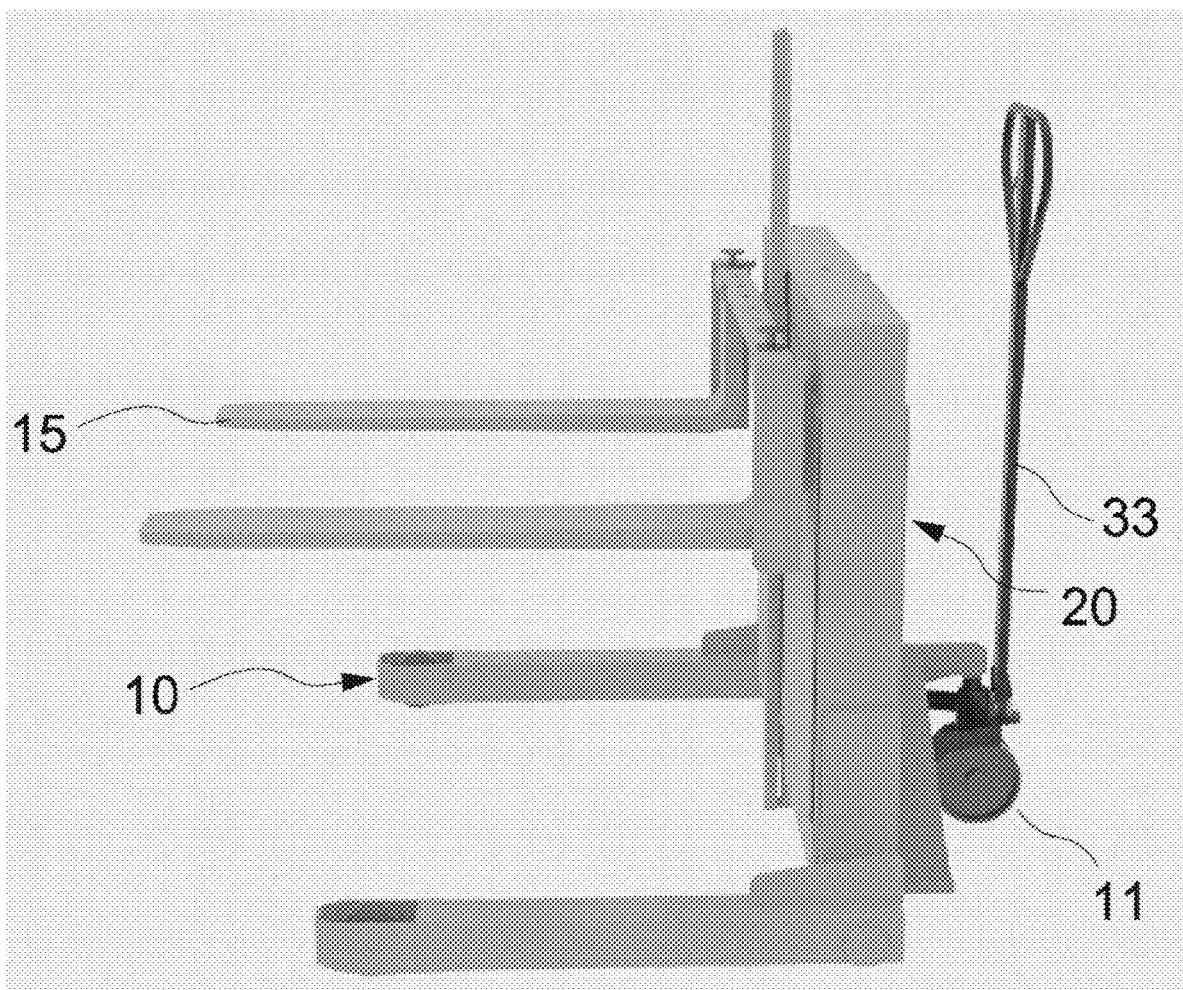
Figure 17:
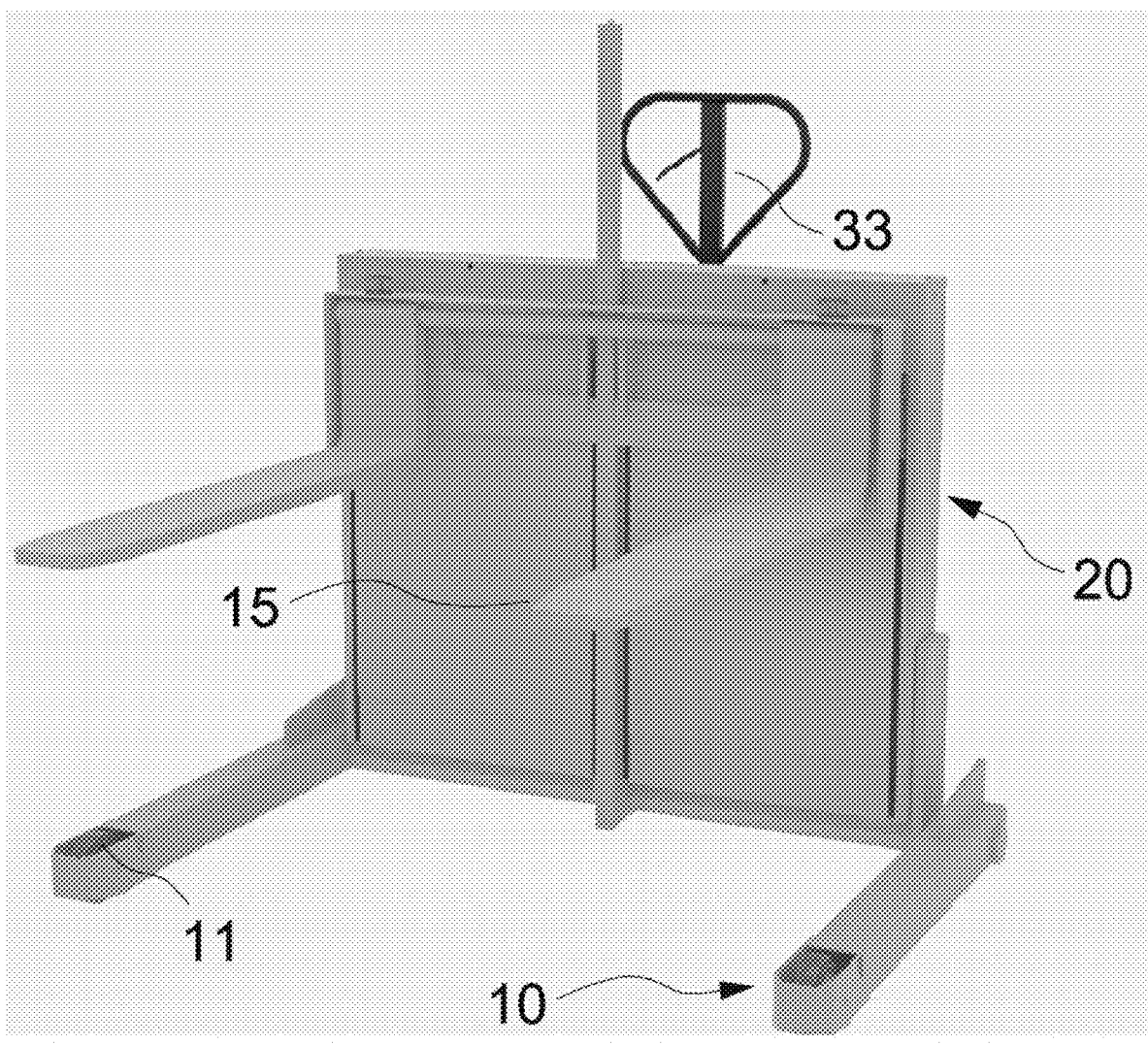

FIGS. 15 to 17 are views illustrating an example of a configuration in which the pair of left and right variable inclination rails and the pair of left and right inclination angle adjustment units are arranged in the multi-stage load adjustment type moving cart according to the present disclosure. An internal structure of the embodiment illustrate in FIGS. 15 to 17 is substantially the same as that of FIG. 6. However, unlike FIG. 6, not a method of generating or releasing the hydraulic pressure using the release lever is used rather a method of manipulating the hydraulic pressure of the hydraulic cylinder 35 with the foot pedal, which may be provided in a structure that is substantially the same as a configuration of a well-known hand pallet truck.

Figure 18A:
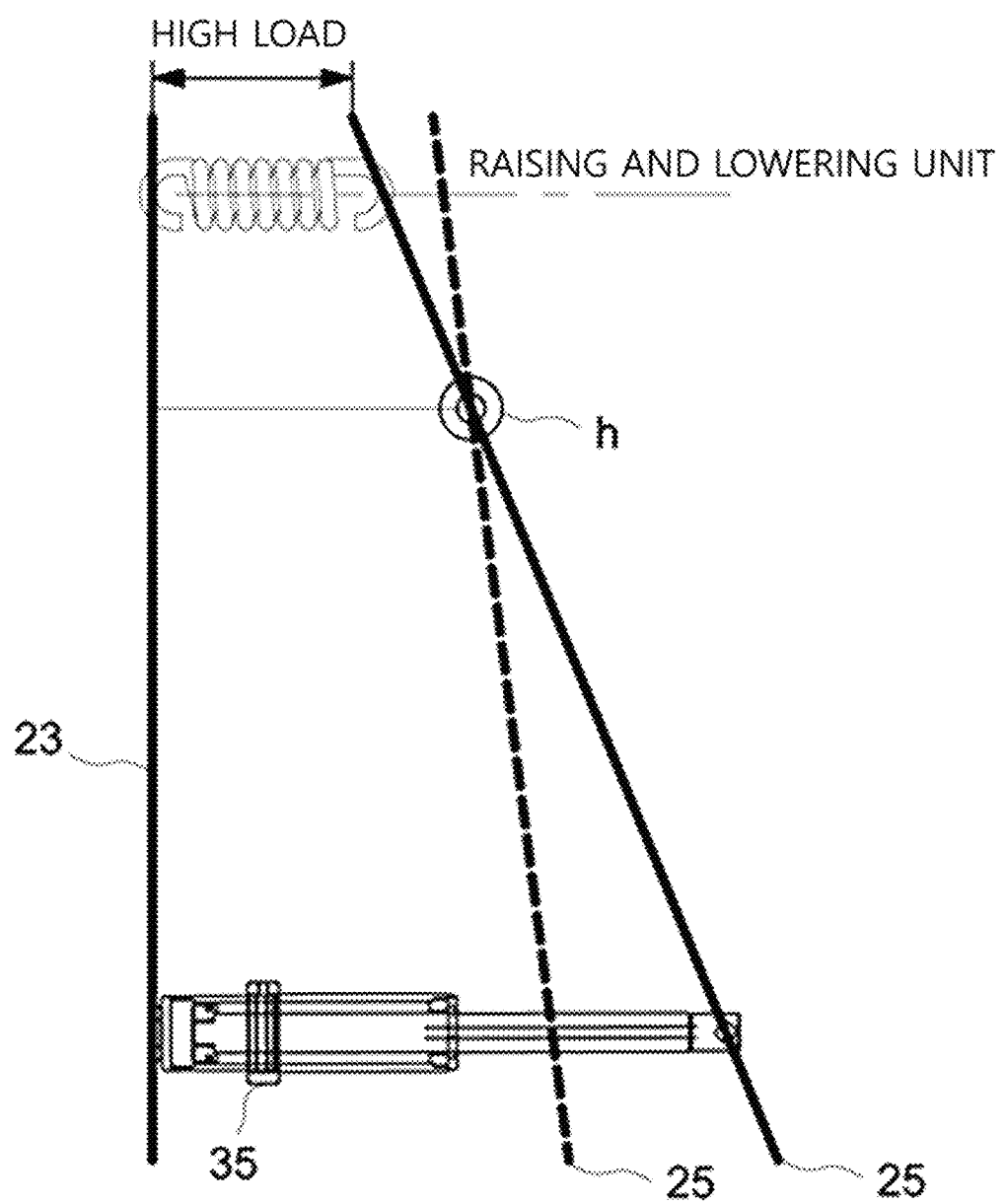
FIGS. 18A and 18B are conceptual diagrams for describing a load change according to an inclination angle of a variable rail with respect to a hinge point in the multi-stage load adjustment type moving cart according to the present disclosure.
Figure 18B:
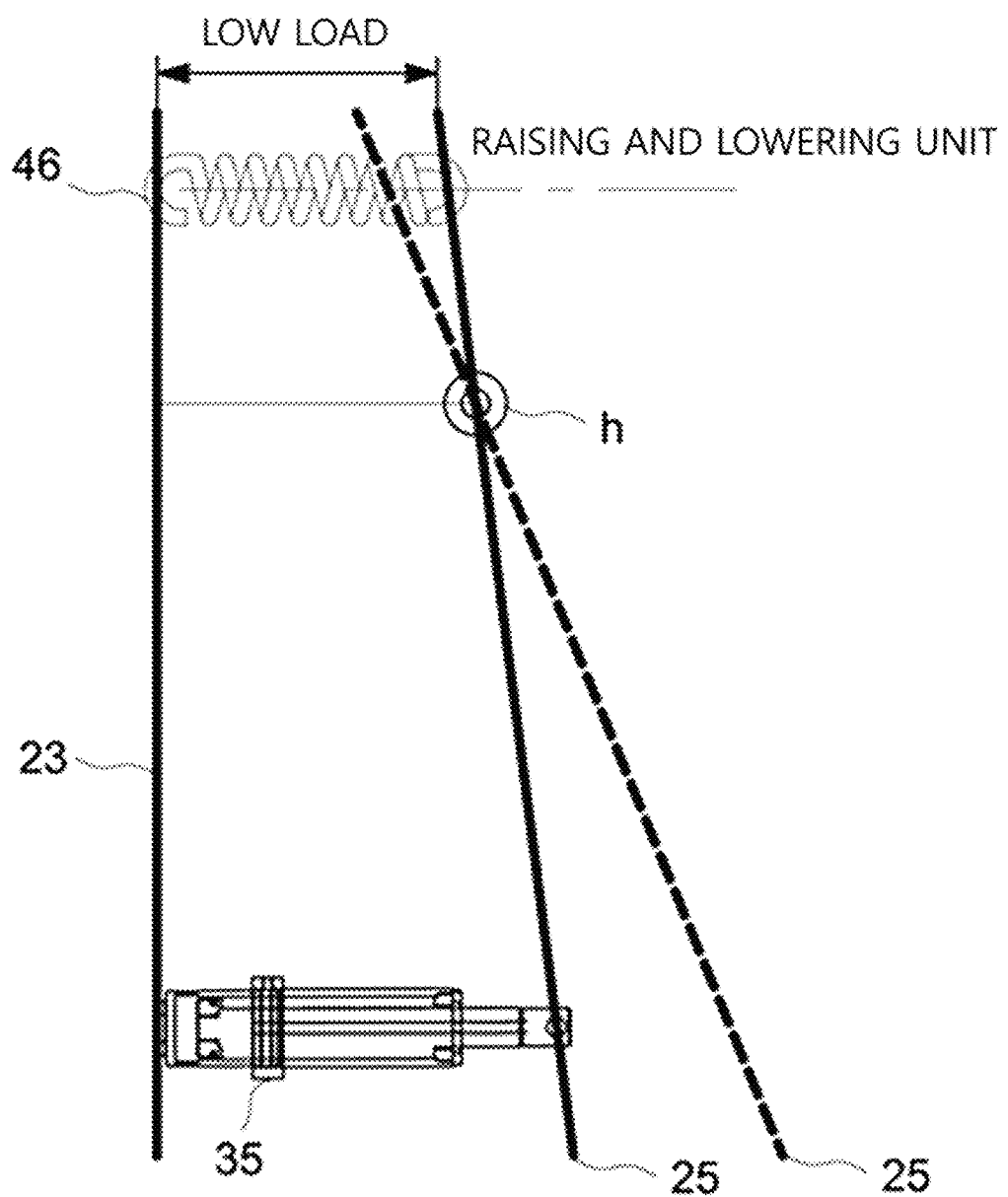

FIGS. 18A and 18B are conceptual diagrams for describing an operation configuration according to the positions of the hinge point and the load spring in the multi-stage load adjustment type moving cart according to the present disclosure. FIG. 18A illustrates a state in which the upper end of the variable inclination rail 25 is rotated to the left side and the lower end of the variable inclination rail 25 is rotated to the right side based on the hinge point h, and in this case, the hydraulic cylinder 35 is maximally elongated to the right side with respect to the hinge point h. In this state, as the inclination angle of the variable inclination rail 25 increases, the cumulative distance in the downward direction based on the hinge point h increases. As a result, the load spring 46, which acts in the downward direction, is elongated to the maximum to generate a high elastic force and thus has a repulsive force against the loaded object having a high load.

On the other hand, FIG. 18B illustrates a state in which the upper end of the variable inclination rail 25 is rotated to the right side and the lower end of the variable inclination rail 25 is rotated to the left side based on the hinge point h, and in this case, the hydraulic cylinder 35 is contracted with respect to the hinge point h. In this state, as the inclination angle of the variable inclination rail 25 decreases, the distance to the same cumulative distance point in the downward direction based on the hinge point h decreases. As a result, the load spring 46, which acts the downward direction, is minimally elongated to generate a low elastic force and thus has a repulsive force against the loaded object having a low load.

Further, as the raising and lowering unit 40 is installed on the upper side based on the hinge point h, an initial tensile force of the load spring 46 located on the upper side based on the hinge point h acts as a larger tensile force than that of FIG. 18A, as in FIG. 18B and thus serves as a tensile force by which the loading table 13 or the fork 15 including the raising and lowering unit 40 can roll upward based on the hinge point h.

Thus, even when the variable inclination rail 25 is rotated to the left side or right side in order to adjust the load, the fork 15 including the raising and lowering unit 40 is not lowered in the downward direction based on the hinge point h, and the fork 15 including the raising and lowering unit 40 is automatically maintained at a constant height. As illustrated in FIG. 5 or 15, in order to maintain this function, a pressure value inherent in a gas spring may perform an auxiliary role, which may not be necessary.

Further, a general gas cylinder may be used as the gas spring, since it is difficult for the load spring 46 of the present disclosure to maintain a uniform load force in the entire region, it is difficult to precisely adjust the load using only the load spring 46 until the load spring 46 is opened to a certain extent. To solve this disadvantage, the gas spring may be additionally provided as an auxiliary part.

Further, the gas spring gs proposed in the present disclosure, which is vertically installed as illustrated in the drawing, has a lower end coupled and fixed to one end of the base frame or a lower end of the vertical frame, has an upper end coupled and fixed to one end of the raising and lowering unit 40, and is provided to act as an elastic support force in the vertical direction.

The multi-stage load adjustment type moving cart according to the present disclosure will be described below with reference to the above drawings.

The multi-stage load adjustment type moving cart 1 according to the present disclosure roughly includes the base frame 10 and the vertical frame which form an outer body, wherein the base frame 10 is provided with the plurality of wheels 11 to be movable, and the vertical frame 20 provides a space where the variable inclination rail 25, the inclination angle adjustment unit 30, and the raising and lowering unit 40 are installed. The multi-stage load adjustment type moving cart 1 further includes the detection module 50 and the control module 60 for preventing cargo from falling and preventing the occurrence of accidents due to collisions with nearby obstacles or workers when moving in a state in which the cargo is loaded thereon.

The base frame 10 is provided with a pair of support frames (no reference number) having an interval sufficient to accommodate the pallet p such that the pallet p may be stably placed thereon, and the support frames are provided with the wheels 11 coming into rolling contact with the ground.

The vertical frame 20 is vertically installed on one side of the base frame 10, and the polygonal fixed rails 23 are vertically installed on both inner sides of the vertical frame 20.

The inclination angle adjustment unit 30 is installed on one side of the vertical frame 20 and receives foot pressure from the worker to generate the operating pressure or receives the operating force from the worker to release the generated operating pressure. The inclination angle adjustment unit 30 roughly includes the foot pedal 31 installed on one side of the vertical frame 20 and configured to receive the foot pressure from the worker, the hydraulic cylinder 35 installed on one inner side of the vertical frame 20, configured to generate the operating pressure in conjunction with the foot pedal 31, and configured to elongate the rod 35r hinge-coupled to the variable inclination rail 25, the release lever 33 configured to release the operating pressure applied to the hydraulic cylinder 35 and protruding from one side of the vertical frame to receive the operating force from the user, and the return spring 36 having one end connected to the body of the hydraulic cylinder 35 and the other end connected to an end of the rod 35r and configured to induce a positional return of the rod 35r when the operating pressure is released.

The inclination angle adjustment unit 30 configured as described above is an element for adjusting the inclination angle by displacing the position of the variable inclination rail 25 provided rotatably around the hinge point h and adjusting the load applied to the raising and lowering unit 40 raised or lowered along the variable inclination rail 25.

Meanwhile, in the present disclosure, the foot pedal 31 is proposed as an element for generating the operating pressure for the hydraulic cylinder 35. However, in addition, as illustrated in FIGS. 15 to 17, a lever method applied to a well-known hand pallet truck may be applied. Further, since this configuration is implemented by a well-known technology, the detailed description thereof will be omitted.

The variable inclination rail 25 has an upper end supported on one side of an upper portion of the vertical frame 20 rotatably around the hinge point h and a lower end connected to the inclination angle adjustment unit 30 and having a rotational displacement around the hinge point h according to an elongated distance of the rod 35r. That is, when the inclination angle of the variable inclination rail 25 is close to vertical as illustrated in FIG. 6, a support force against the load is low, and the loading table 13 or the fork 15 provided in the raising and lowering unit 40, which will be described below, is thus in a state of being fallen and moved close to the ground. In contrast, when the variable inclination rail 25 has an inclination angle as illustrated in FIG. 7, a large load is applied to a raising and lowering operation of the raising and lowering unit 40, and the height of the cargo having a relatively high load can thus be adjusted.

The raising and lowering unit 40 includes the raising and lowering body 41 including the first rollers 42 and the second rollers 43 coming into rolling contact with the polygonal fixed rail 23 vertically installed on one inner side of the vertical frame 20 and the load spring 46 having one end fixed to one side of the raising and lowering body 41 and the other end fixed to the inclination roller 45 coming into rolling contact along the variable inclination rail 25 to apply an elastic force.

Meanwhile, the raising and lowering unit 40 is provided with the loading table 13 that provides a flat loading surface to perform various tasks as well as loading work in a state in which the loaded object is placed thereon or is provided with the pair of forks 15 protruding from one side thereof to hold the pallet p in the horizontal direction.

The detection module 50 roughly includes the obstacle sensor 51, the camera sensor 53, the traveling sensor 55, and the falling object sensor 57 and is an element for preventing the risk of accidents and improving convenience when the multi-stage load adjustment type moving cart according to the present disclosure is moved.

The obstacle sensor 51 is a detection element installed on the front side based on a traveling direction of the base frame 10 and configured to detect the approach of nearby obstacles or other workers, a well-known infrared sensor, a well-known ultrasonic sensor, a well-known laser sensor, or the like that can detect the approach of an object may be used as the obstacle sensor 51, and although not illustrated, the obstacle sensor 51 is configured to receive electric power from a battery installed on one side of the base frame 10.

The obstacle sensor 51 is an element for detecting the approach of obstacles, people, or the like and applying the detected information to the control module 60 since the front side based on the traveling direction cannot be visually identified when the moving cart moves by being pushed from behind in a state in which the height of the loaded cargo is higher than the eye level of a transport worker.

The camera sensor 53 is an imaging element installed on one side of the obstacle sensor 51 and configured to display, on a screen, a front-side situation based on the traveling direction of the multi-stage load adjustment type moving cart and may be implemented by a well-known technology, and thus the detailed description thereof will be omitted.

The traveling sensor 55 is configured to detect whether the multi-stage load adjustment type moving cart according to the present disclosure is to move. In the present disclosure, a wheel sensor configured to detect the rolling motion of the wheels 11 may be used as the traveling sensor 55. In addition, various well-known sensors configured to detect the rolling motion of wheels may be used as the traveling sensor 55.

The falling object sensor 57 is a detection element for detecting and determining whether there is a falling object during traveling by measuring the amount of raising and lowering displacement of the raising and lowering unit 40 or detecting a change in the weight of the loading table 13. A tension sensor configured to detect a tensile force of the load spring 46 constituting the raising and lowering unit 40 or a level sensor configured to detect a change in the height of the loading table 13 may be used as the falling object sensor 57. In addition, the falling object sensor 57 may be provided in the form of a load cell attached to the upper surface of the loading table 13 and configured to detect the weight of the loaded cargo.

The control module 60 is an element provided on one side of the base frame 10 and configured to receive a detection signal from the obstacle sensor 51, the falling object sensor 57, and the camera sensor 53 and to apply a control signal to a notification display unit 70 providing detection information to the user. The control module 60 includes a traveling determination unit 61, a falling object determination unit 63, and a monitoring control unit 65.

The traveling determination unit 61 is a control element connected to the traveling sensor 55 and configured to determine whether the moving cart is traveling by receiving whether the wheels 11 are rolling in real-time.

The falling object determination unit 63 is a control element operated by receiving a signal indicating that the moving cart is in a traveling state from the traveling determination unit 61 and configured to determine whether there is a falling object by detecting whether the amount of raising and lowering displacement of the raising and lowering unit 40 occurs or whether the weight of the cargo on the loading table 13 changes by receiving the detection information from the falling object sensor 57 in real-time. That is, when the multi-stage load adjustment type moving cart moves while the cargo is loaded thereon and when a part of the loaded cargo falls, the raising and lowering displacement occurs depending on a change in the weight of the cargo or the weight of the cargo loaded on the loading table 13 changes, and thus the raising and lowering unit 40 determines the presence or absence of the falling object based on the raising and lowering displacement and the change in the weight.

The monitoring control unit 65 is an element configured to receive the detection information from the falling object determination unit 63 and the camera sensor 53 and to apply the control signal to the notification display unit 70. That is, the monitoring control unit 65 detects the presence or absence of the falling object in real time, and when it is determined that there is a falling object, outputs warning text, light emitting diode (LED) lighting, or a warning sound such that the transport worker can easily recognize the warning through the notification display unit 70. In addition, the monitoring control unit 65 allows the transport worker to be able to identify image information captured by the camera sensor 53 installed on the front side based on the traveling direction through a display constituting the notification display unit 70 in real time.

Meanwhile, the notification display unit 70 includes a display capable of displaying images and information on a screen and may additionally include a warning lamp and a speaker configured to output a warning sound.

The present disclosure configured as described above can secure a front view, based on the traveling direction, through the camera sensor 53 and the notification display unit 70 even when the front view is obscured by the cargo and allows the transport worker to easily recognize that a part of the loaded cargo has fallen even when the loaded cargo falls, thereby increasing work efficiency.

In particular, in the multi-stage load adjustment type moving cart according to the present disclosure, only when the moving cart moves, that is, only when the wheels 11 are rolling, the falling object sensor 57 and the camera sensor 53 are operated, and thus battery consumption caused by operating unnecessary electronic components can be minimized.

The multi-stage load adjustment type moving cart according to the present disclosure can be used for cargo having various loads and has the height automatically adjusted according to the load size of the loaded cargo, and thus a useful effect is expected in that the convenience and efficiency of work according to loading and unloading of the cargo can be increased.

In particular, the multi-stage load adjustment type moving cart determines whether the cargo falls when the moving cart moves and informs a worker in real time, and thus the risk of accidents due to falling objects and the concern about loss can be eliminated, and safe movement can be achieved through warning for an obstacle in a traveling direction.

The features and advantages of the present disclosure will become more apparent from the following detailed description based on the accompanying drawings. Prior to this, terms or words used in the present specification and the appended claims should not be interpreted with usual or dictionary meanings and should be interpreted with meanings and concepts corresponding to the technical spirit of the present disclosure based on the principle that the inventor may appropriately define the concepts of the terms in order to describe his/her invention in the best way.

Meanwhile, the present disclosure is not limited to the above-described embodiments and can be used while changing an application part. It is obvious to those skilled in the art that various modifications and changes can be made without departing from the spirit and scope of the present disclosure. Thus, the modifications and changes should belong to the appended claims of the present disclosure.

What is claimed is:

1. A multi-stage load adjustment type moving cart comprising:
    a base frame provided with a plurality of wheels coming into rolling contact with the ground and a vertical frame vertically installed on one side of the base frame;
    an inclination angle adjustment unit installed on one side of the vertical frame, configured to receive an operating force to generate an operating pressure, and configured to selectively elongate a rod;
    a variable inclination rail having an upper one end supported to be rotatable around a hinge point hinge-coupled to the vertical frame and having one lower end connected to the inclination angle adjustment unit, the one lower end having a lever type rotational displacement around the hinge point according to an elongation distance of the rod;
    a raising and lowering unit comprising a raising and lowering body provided with a first roller and a second roller coming into rolling contact with a polygonal fixed rail vertically installed on one inner side of the vertical frame, a load spring having one end fixed to one side of the raising and lowering body, having the other end fixed to an inclination roller coming into rolling contact along the variable inclination rail, configured to apply an elastic force, and placed on an upper side based on the hinge point, and a loading element having a pair of forks for holding a loading table or a cargo loaded pallet having a flat upper surface in a horizontal direction to load cargo;
    a detection module comprising an obstacle sensor installed on a front side based on a traveling direction of the base frame and configured to detect approach of a nearby obstacle or a nearby worker, a camera sensor provided on one side of the obstacle sensor and configured to capture an image, a traveling sensor configured to detect a rolling motion of the wheels, and a falling object sensor configured to detect and determine whether there is a falling object during traveling by detecting an amount of raising and lowering displacement or a change in a weight of the raising and lowering unit; and
    a control module provided on one side of the base frame, configured to receive signals from the obstacle sensor, the falling object sensor, and the camera sensor, and configured to apply a control signal to a notification display unit providing detection information to a user.

2. The multi-stage load adjustment type moving cart of claim 1, wherein the control module comprises:
- a traveling determination unit connected to the traveling sensor and configured to determine whether the moving cart is traveling;
- a falling object determination unit configured to determine whether there is a falling object by receiving detection information of the falling object sensor when the traveling determination unit detects the traveling of the moving cart; and
- a monitoring control unit configured to receive detection information from the falling object determination unit and the camera sensor and configured to apply a control signal to the notification display unit configured to output a screen or a sound.

3. The multi-stage load adjustment type moving cart of claim 1, wherein the inclination angle adjustment unit (30) comprises:
- a foot pedal (31) installed on one side of the vertical frame (20) and configured to receive foot pressure from a worker;
- a hydraulic cylinder (35) installed on one inner side of the vertical frame (20), configured to generate the operating pressure in conjunction with the foot pedal (31), and configured to elongate the rod (35r) hinge-coupled to the variable inclination rail (25);
- a release lever (33) configured to release the operating pressure applied to the hydraulic cylinder (35) and protruding from one side of the vertical frame (20) to receive the operating force from the user; and
- a return spring (36) having one end connected to a body of the hydraulic cylinder (35) and the other end connected to an end of the rod (35r) and configured to induce a positional return of the rod (35r) when the operating pressure is released.

4. The multi-stage load adjustment type moving cart of claim 1, wherein a gas spring having a lower end coupled and fixed to one end of one of the base frame and the vertical frame and an upper end coupled to one end of the raising and lowering unit and configured to apply an elastic support force in a vertical direction is installed.

* * * * *